United States Patent
McKay et al.

[15] 3,649,180
[45] Mar. 14, 1972

[54] PURIFICATION OF ZINC SULPHATE SOLUTION

[72] Inventors: Donald Roderick McKay, Rossland; Louis Landucci, Trail, both of British Columbia, Canada

[73] Assignee: Cominco Ltd., Montreal, Quebec, Canada

[22] Filed: Mar. 26, 1970

[21] Appl. No.: 22,836

[30] Foreign Application Priority Data

Dec. 31, 1969 Canada...................................71,251

[52] U.S. Cl. ...................................23/125, 204/114, 23/1 R
[51] Int. Cl................................................C01g 9/06
[58] Field of Search...............................23/125, 1

[56] References Cited

UNITED STATES PATENTS 1,255,434   2/1918   Laist et al. ..........................23/125 X
1,672,016   6/1928   Williams et al. .........................23/125

OTHER PUBLICATIONS

Perry's "Chemical Engineers' Handbook," Fourth Edition, 1963, Chapt. 21, page 54. McGraw–Hill Book Co., Inc., New York.

*Primary Examiner*—Edward Stern
*Attorney*—Smart and Biggar

[57] ABSTRACT

A process for continuously purifying a flowing zinc sulphate solution in the treatment of zinc-bearing ores in the recovery of zinc, wherein zinc dust is added to the flowing solution which is agitated to effect a precipitating reaction between the zinc dust and cations of impurity metals more noble than zinc. The treated solution is then passed through a cyclone to reactivate unconsumed zinc, with the resulting overflow stream containing purified zinc sulfate solution and finely divided precipitated impurities for subsequent separation, and an underflow stream containing suspended solids comprising reactivated zinc dust and agglomerates, which underflow stream is recycled to the zinc sulfate solution being agitated to effect the precipitating reaction. The process requires relatively less zinc dust than previous purification processes and avoids buildup of solids in the apparatus.

9 Claims, 1 Drawing Figure

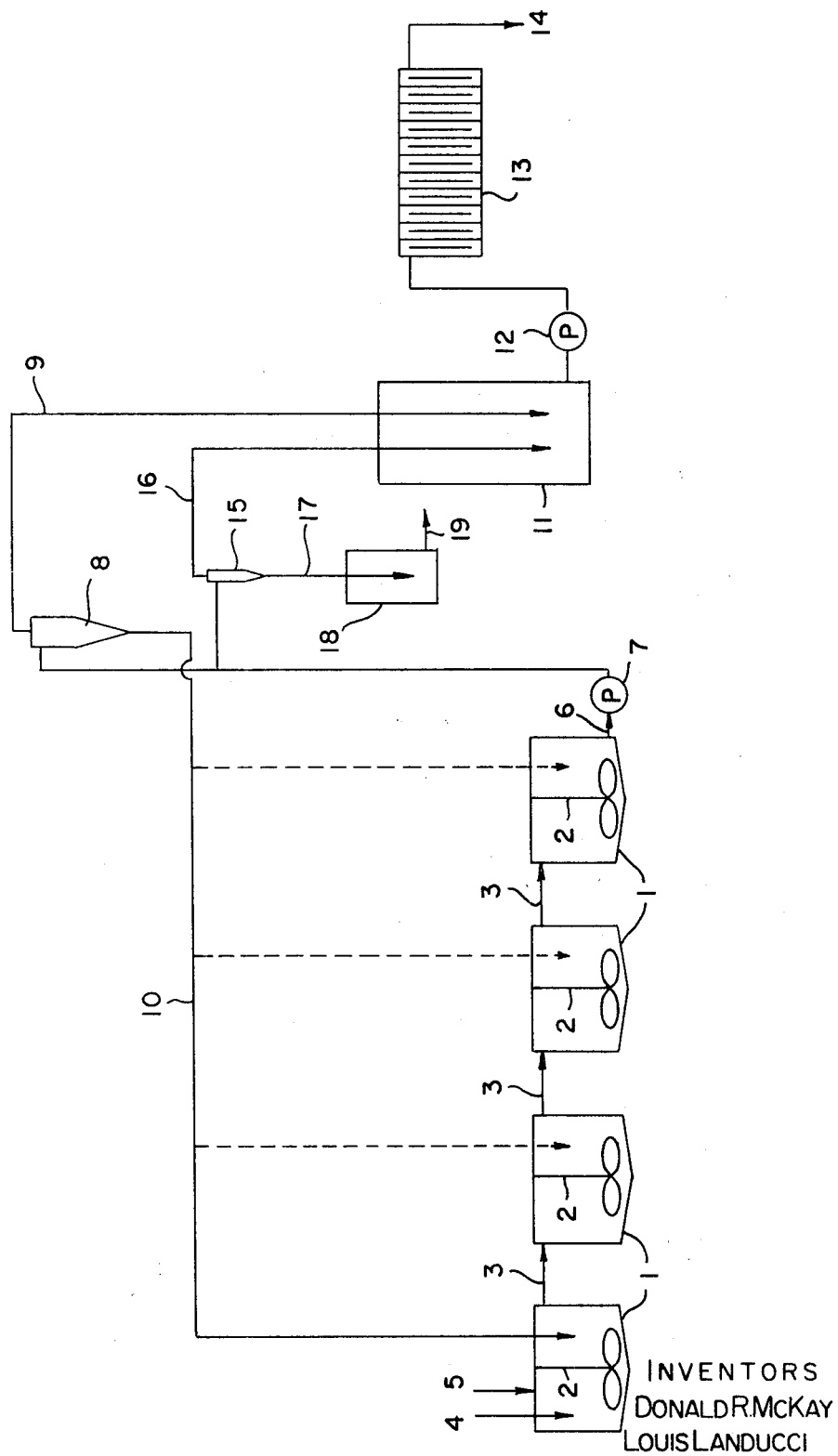

PURIFICATION OF ZINC SULPHATE SOLUTION

BACKGROUND OF THE INVENTION

1. Field of the Invention

This invention relates to an improvement in the treatment of zinc bearing ores for the recovery of zinc by electrolytic deposition. More particularly, it relates to the purification of a crude zinc sulfate solution to be used in electrolytic cells.

2. Description of the Prior Art

In the zinc metallurgical process, a zinc sulfate solution obtained by the sulfuric acid digestion of roasted zinc concentrates is purified before being used in electrolytic cells to produce metallic zinc. It is known that generally the presence of cations of metals other than zinc, such as cadmium or copper, reduces the efficiency of the electrolytic process and the purity of the zinc deposit. For efficient operation it is therefore essential that these metallic cations should be removed.

After the crude sulfate solution has been formed by sulfuric acid digestion, and acid insoluble residues have been removed, the solution is neutralized and iron and other metals such as germanium, arsenic and antimony are separated out by oxidation and hydrolysis. The resulting clarified neutral zinc sulfate solution is then treated with very fine zinc dust for the precipitation of metals such as cadmium and copper which are more noble than zinc, i.e., below zinc in the electromotive series. This may be accomplished batchwise or continuously. In a known continuous process, treatment is in two stages. A primary purification is usually effected in large vessels having mechanical agitators. Impure solution and a substantial excess of zinc dust flow through a series of such vessels. Agitation assists the reaction in which zinc goes into solution, releasing finely divided metal particles of the nobler metals. The solution and suspended particles of precipitated metals and unconsumed zinc then move to a pump tank and thence to a filter for their removal. This primary purification removes most of the cadmium and copper. A secondary purification, also by zinc dust addition, increases the purity of the electrolyte.

Certain problems have long been associated with this process. Much more zinc dust than should theoretically be necessary for removal of the impurities must be used. Many methods to increase the reactivity of the zinc dust have been proposed. These include the use of finer particle size to get greater surface area and the inclusion of additives to increase the efficiency of the reaction. There is a tendency of the cadmium, with some zinc, to form hard agglomerates about one-eighth inch in diameter known as cadmium sponge balls. Further agglomeration of this cadmium sponge with unconsumed zinc results in the formation of hard crusts that accumulate in the reaction vessels, pumps and communicating piping. Plugging occurs and costly emergency shutdowns for cleaning are frequent. The zinc dust treatment of the zinc sulfate solution is carried out under nonoxidizing conditions. Exposure of the solution to air causes redissolving of the precipitated nobler metals. Encrustations make the maintenance of equipment seals for excluding oxygen very difficult and much oxidation occurs during maintenance shutdowns.

Various attempts have been made in the past to improve the above operation but the prior art proposals have been found to be commercially unacceptable. According to one such proposal, the impure zinc sulfate solution together with zinc dust was passed continuously through an enclosed purification vessel with vigorous agitation, and then to a rotating separator for separating the solution containing the precipitated impurities in suspension from unconsumed zinc dust under enclosed conditions. The separated, unconsumed zinc dust was returned to the inflow of the purification chamber and the separated solution containing the precipitated impurities was passed in suspension to a filter press for removal and recovery of the metallic precipitate, with the solution passing to the electrolytic cells or other treatments for the recovery of zinc. Problems inherent in such a system include loss of activity of the recycled zinc dust and buildup of solids in the purification vessels. Plugging of the separation apparatus also occurs.

SUMMARY OF THE INVENTION

It is an object of the present invention to provide an improved process overcoming many of the above disadvantages for the treatment of zinc-bearing ores for the recovery of zinc.

According to the present invention it has been surprisingly discovered that a continuous purification process can be operated with a relatively much smaller zinc dust requirement for removal of undesired impurities by passing the effluent stream from the purification vessels through a cyclone, returning the underflow with suspended zinc dust and agglomerates from the cyclone to the purification vessels and sending the overflow from the cyclone to a filter to remove precipitated impurities. To prevent oxidation and redissolving of precipitated metals, the entire system is closed so as to exclude air from both underflow and overflow by discharging each through a seal tank.

The cyclone apparently has the effect of reactivating the zinc dust. This reactivation is believed to be due to the shearing action in the cyclone of the rapidly swirling solution on the solids being recycled. In the cyclone, not only are the cadmium sponge balls separated from the overflow solution, but apparently smaller precipitated particles of copper and cadmium adhering to the zinc dust are also detached and removed with the overflow. The result of this action is that the zinc dust being recycled to the purification vessels presents clean fresh surfaces and, therefore, much smaller amounts of makeup zinc dust need to be added to the purification vessels. Extremely fine zinc dust particles of course leave the cyclone with the overflow.

In a prolonged continuous operation of this type, there does tend to be an accumulation of cadmium sponge balls, and these agglomerates should be removed from the purification system before they have grown too large to be maintained in suspension by the purification vessel agitators. We have found that the agglomerates can be conveniently purged by passing a part of the effluent from the purification vessels through a second, smaller cyclone with the underflow going to a cadmium recovery plant and the overflow joining the overflow from the main cyclone. We have also found that scheduled, intermittent operation of this small bypass cyclone is sufficient to prevent the accumulation of solids in the purification vessels.

Frequency and extent of required cleaning of the purification vessels have been sharply reduced by the use of the process of this invention. For example, a schedule which formerly involved once-a-month cleaning of vessels that were half filled with zinc dust-cadmium sponge agglomerates, has now been reduced to cleaning of baffles in the purification vessels once every 6 months.

BRIEF DESCRIPTION OF THE DRAWING

The invention is illustrated by the attached drawing which is a schematic flowsheet of the process.

Conventionally baffled purification vessels 1, with mechanical agitators 2 to keep solids in suspension, are flow connected in series by closed launders 3. Neutral zinc sulfate solution 4 and zinc dust 5 are fed separately into the vessels 1.

The effluent stream 6 from the last of the series of vessels 1 is pumped via pump 7 through cyclone 8. The overflow 9 from the cyclone is carried by a closed pipe to closed receiving vessel 11 where the solution is discharged below the liquid level. Pump 12 transfers the solution to filter 13 where precipitated impurities are removed, to be treated for cadmium recovery, and stream 14 of purified zinc sulfate is passed to secondary purification equipment and thence to electrolytic cells for electrolytic recovery of zinc.

The underflow 10 from cyclone 8, containing reactivated zinc dust, is returned to the purification vessels 1.

DESCRIPTION OF THE PREFERRED EMBODIMENTS

According to a preferred embodiment an additional small cyclone 15 is also provided. This small cyclone is operated on a scheduled intermittent basis, e.g., for a period of ¼ to ½ hour during each day of operation of the entire system. A part of effluent stream 6 passes through cyclone 15 during the operational period with the overflow 16 passing directly to receiving vessel 11 and the underflow 17 going to closed receiving vessel 18 and thence, via conduit 19, to a cadmium recovery plant.

Since the zinc dust and the cadmium sponge adhere to clean metallic surfaces, the inner surfaces of cyclones 8 and 15 may be lined with rubber or a plastic that is inert to the solution. It was found in practice that a polyvinylchloride apex carried the underflow successfully but abraded very rapidly. A cylindrical glass apex section handles the flow without adhesion or abrasion, and, in addition, permits visual inspection of the operation. Visually observed spiralling flow of black effluent is an intermediate indicator of satisfactory operation. Cyclone 8 is elevated above primary purification tanks 1 and storage tank 11. Rapid flows of exit solutions 9 and 10 exert a siphoning effect. At the inlet of the cyclone there is actually a slight vacuum and the pressure drop across the cone is not more than 2 to 3 pounds per square inch. Return underflow 10 is conveyed in a heavy-walled plastic pipe which, to minimize exposure to the air, discharges below the solution level in a purification tank. A tall, relatively small diameter storage tank 11 was found to be more convenient than other shapes.

Using the process of the invention, it has been found that a more complete precipitation of cadmium and the other impurity metals is obtained in the primary purification vessels. The impure zinc sulfate solution normally contains 150–500 mg. per liter of cadmium before treatment and there was usually 10 to 25 mg. per liter in the purified filtrate using a conventional purification process. With the process of the invention, the cadmium in solution after the filter press is normally less than 5 mg. per liter. Conversely, the ratio of cadmium to zinc in the filter press residue has been raised from 0.20 to about 0.40. With less solids in the solution entering the filter presses, each press can process more solution before cleaning is required.

The process of the invention has reduced the zinc dust requirements from about 40 to 50 pounds per ton to about 15 to 25 pounds per ton of zinc produced, which corresponds to an increase of about 1 percent in the output of salable zinc. Moreover, accumulation of zinc in the circuit has been virtually eliminated and the amount of cadmium to be removed in secondary purification has been correspondingly reduced.

Relatively coarse, heterogeneously sized, zinc dust has been found to be quite effective for cadmium removal in the process of the invention. In fact, coarse zinc dust appears to be better than a very fine, uniformly sized product as there is less oxide film to be removed from freshly added dust and the presence of larger particles appears to add autogenous cleansing to the cyclone action. For example, the very fine zinc dust previously used was about 95 percent minus 325 mesh, while the zinc dust preferably used in the process of the invention is about 95 percent minus 65 mesh and about 70 percent plus 200 mesh.

Because the siphoning action of the descending overflow and underflow discharges from the main cyclone placed in an elevated position, one relatively small pump can handle all solution being processed. Energy required to pass the solution through the cyclone is low.

Further advantages are reduction in the quantity of solids that must be removed by filtration and a higher grade of cadmium precipitate from which cadmium is recovered. The circulating load of unconsumed zinc dust ensures continuation of the process in case of short failure of the dust feeding system.

The invention is illustrated by the following nonlimitative example which is representative of operation for a 24-hour day.

Cyclone 8 was 24 inches in diameter, had a 4-inch apex and had a 12-inch vortex finder. Cyclone 15 was 12 inches in diameter.

| | |
|---|---|
| Solution throughput (per day) | 1,500,000 gallons |
| Fresh zinc dust added (20 lb./ton Zn produced) | 7,000 pounds or 0.47 g./l. fresh solution |
| Recycled underflow of cyclone 8 | 50,000 gallons containing 68,000 pounds zinc |
| Recycled solids | 4.5 g./l. of total flow |
| Total zinc dust added to tank 1 | Approx. 5 g./l. |
| Zinc removed in cyclone 15 underflow | 1,000 pounds |
| Zinc advancing in overflows 9 and 16 | 6,000 pounds |

Part of the 6,000 pounds of zinc advancing in the overflow is in solution, e.g., with precipitation of 300 mg./l. Cd, about 2,400 pounds of zinc dust would become dissolved.

Typical impurity contents of the zinc sulfate solution before and after treatment with zinc dust were as follows:

| | Impurity content—mg./l. | | | |
|---|---|---|---|---|
| | Cu | Cd | Pb | Sb |
| Before treatment | 30 | 200 | 13 | 0.05 |
| After treatment | None detected | 4 | 0.4 | 0.03 |

If desired, a secondary purification can be carried out to remove some of the residual impurities, particularly cadmium, from the treated zinc sulfate solution. The secondary purification is carried out in a similar manner to the primary purification described above with the underflow of a cyclone being returned to the primary purification tanks.

What I claim as my invention is:

1. In the treatment of zinc-bearing ores for recovery of zinc, a continuous process for purifying a flowing impure neutral zinc sulfate solution under nonoxidizing conditions, which comprises the steps of continuously adding zinc dust to the flowing solution, agitating the flowing solution in the presence of the dust to effect a precipitating reaction between the zinc dust and cations of impurity metals more noble than zinc present in the solution, passing the thus treated flowing solution through a cyclone to reactivate unconsumed zinc and to divide the solution into an underflow stream and an overflow stream, said underflow stream containing in suspension coarser solids comprising reactivated zinc dust and agglomerates, and said overflow stream containing finely divided precipitated impurities suspended in zinc sulfate solution, recycling said underflow stream to said solution being agitated to effect said precipitating reaction, and separating the precipitated impurities from the overflow stream of purified zinc sulfate solution.

2. A process according to claim 1 wherein the impurity metals comprise cadmium and copper.

3. A process according to claim 2 wherein the zinc sulfate solution to be purified contains 150–500 mg./l. of cadmium.

4. A process according to claim 1 wherein the purified zinc sulfate solution contains less than 5 mg./l. of cadmium.

5. A process according to claim 3 wherein 15 to 25 pounds of fresh zinc dust is used per ton of zinc produced.

6. A process according to claim 3 wherein the overflow solution containing precipitated impurities in suspension is filtered to remove the suspended solids.

7. A process according to claim 6 wherein the suspended solids which are removed are treated for recovery of cadmium.

8. A process according to claim 1 wherein a portion of the flowing zinc sulfate solution from the agitation and precipitating step is passed through a second cyclone to remove coarse agglomerates.

9. A process according to claim 8 wherein the overflow of the second cyclone is added to the overflow of the first cyclone, and the underflow of the second cyclone is treated for recovery of cadmium.

* * * * *